US009719031B2

(12) United States Patent
Bonné et al.

(10) Patent No.: US 9,719,031 B2
(45) Date of Patent: Aug. 1, 2017

(54) TITANIA-SUPPORTED HYDROTREATING CATALYSTS

(75) Inventors: Raimond L. C. Bonné, Amersfoort (NL); Olga Gonsiorová, Litvínov (CZ); Markus Schulte, Oberhausen (DE)

(73) Assignee: Sachleben Chemie GmbH, Duisburg (DE)

( * ) Notice: Subject to any disclaimer, the term of this patent is extended or adjusted under 35 U.S.C. 154(b) by 553 days.

(21) Appl. No.: 13/994,772

(22) PCT Filed: Dec. 19, 2011

(86) PCT No.: PCT/EP2011/073210
§ 371 (c)(1),
(2), (4) Date: Jul. 1, 2013

(87) PCT Pub. No.: WO2012/084800
PCT Pub. Date: Jun. 28, 2012

(65) Prior Publication Data
US 2013/0294985 A1    Nov. 7, 2013

(30) Foreign Application Priority Data
Dec. 20, 2010  (EP) .................................... 10196016

(51) Int. Cl.
*B01J 21/00*    (2006.01)
*B01J 23/00*    (2006.01)
*B01J 25/00*    (2006.01)
*B01J 29/00*    (2006.01)
*C10G 45/04*    (2006.01)
*B01J 21/06*    (2006.01)
*B01J 23/882*   (2006.01)
*B01J 23/883*   (2006.01)
*B01J 23/94*    (2006.01)
*B01J 35/00*    (2006.01)
*B01J 35/02*    (2006.01)
*B01J 35/10*    (2006.01)
*B01J 37/02*    (2006.01)
*B01J 37/20*    (2006.01)
*C10G 45/08*    (2006.01)
*C01B 17/16*    (2006.01)

(52) U.S. Cl.
CPC ............ *C10G 45/04* (2013.01); *B01J 21/063* (2013.01); *B01J 23/882* (2013.01); *B01J 23/883* (2013.01); *B01J 23/94* (2013.01); *B01J 35/0026* (2013.01); *B01J 35/026* (2013.01); *B01J 35/1014* (2013.01); *B01J 35/1019* (2013.01); *B01J 35/1038* (2013.01); *B01J 35/1042* (2013.01); *B01J 37/0201* (2013.01); *B01J 37/0213* (2013.01); *B01J 37/20* (2013.01); *C01B 17/164* (2013.01); *C10G 45/08* (2013.01)

(58) Field of Classification Search
USPC ....................... 502/305, 100, 300
See application file for complete search history.

(56) References Cited

U.S. PATENT DOCUMENTS

| 3,556,984 | A | 1/1971 | Van |
| 4,107,262 | A | 8/1978 | Lueders et al. |
| 4,186,080 | A | 1/1980 | Mikovsky et al. |
| 4,422,960 | A | 12/1983 | Shiroto et al. |
| 4,442,960 | A * | 4/1984 | Vetter ........................ B62J 9/00 190/108 |
| 4,795,726 | A | 1/1989 | Schaper et al. |
| 6,171,566 | B1 | 1/2001 | Ku et al. |
| 6,180,072 | B1 | 1/2001 | Veal et al. |
| 6,800,267 | B2 | 10/2004 | Schubert et al. |
| 7,384,611 | B2 | 6/2008 | Chen |
| 8,715,827 | B2 | 5/2014 | Rohe et al. |
| 9,211,526 | B2 | 12/2015 | Auer et al. |
| 2009/0010834 | A1 | 1/2009 | Rameshni |
| 2010/0038285 | A1* | 2/2010 | Toledo Antonio ..... B01J 21/063 208/143 |
| 2010/0069233 | A1 | 3/2010 | Toledo Antonio et al. |
| 2010/0111787 | A1 | 5/2010 | Kim et al. |
| 2013/0011515 | A1 | 1/2013 | Knights |
| 2013/0172176 | A1* | 7/2013 | Proft .................. B01D 53/8628 502/242 |

FOREIGN PATENT DOCUMENTS

| CN | 101360560 A | 2/2009 |
| EP | 0244014 A2 | 4/1987 |
| EP | 1090675 A1 | 4/2001 |
| EP | 1748033 A1 | 1/2007 |
| EP | 1902769 A1 | 3/2008 |
| GB | 786435 A | 11/1957 |
| GB | 820164 A | 9/1959 |
| GB | 1456026 A | 11/1976 |
| GB | 1516162 A | 6/1978 |
| JP | 5640432 A | 4/1981 |

(Continued)

OTHER PUBLICATIONS

International application No. PCT/EP2011/073210, International Preliminary Report on Patentability, dated Sep. 2013.
Toledo-Antonio, J A., et al., "Highly Active CoMoS Phase on Titania Nanotubes as New Hydrodesulfurization Catalysts," Applied Catalysis B: Environmental, Jul. 2009, pp. 213-223, vol. 90, No. 1-2.
Escobar, J., et al., "Highly Active Sulfided CoMo Catalyst on Nano-Structured TiO2," Catalysis Today, Oct. 2005, pp. 222-226, vol. 106, No. 1-4.
Cortes-Jacome, et al., "Highly Dispersed CoMoS Phase on Titania Nanotubes as Efficient HDS Catalysts," Catalysis Today, Nov. 2007, pp. 56-62, vol. 130, No. 1.
Dzwigaj, S., et al., "New Generation of Titanium Dioxide Support for Hydrodesulfurization," Applied Catalysis, Mar. 2003, pp. 181-191, vol. 41, No. 1-2.

(Continued)

*Primary Examiner* — James McDonough
(74) *Attorney, Agent, or Firm* — Cahn & Samuels, LLP

(57) ABSTRACT

$TiO_2$-supported catalysts include at least molybdenum or tungsten as active components for hydrotreating processes, in particular for the removal of sulfur and nitrogen compounds as well as metals out of crude oil fractions and for the hydrogenation of sulfur oxides.

19 Claims, No Drawings

(56) References Cited

FOREIGN PATENT DOCUMENTS

| | | |
|---|---|---|
| JP | S5632308 A | 4/1981 |
| JP | S5980737 A | 5/1984 |
| JP | H08183964 A | 7/1996 |
| JP | 2008296187 A | 12/2008 |
| JP | 2009513786 A | 4/2009 |
| WO | 99/02258 A1 | 1/1999 |
| WO | 99/58732 A1 | 11/1999 |
| WO | 03/045544 A1 | 6/2003 |
| WO | 2004073854 A1 | 9/2004 |
| WO | 2008/111802 A1 | 9/2008 |
| WO | 2009116989 A1 | 9/2009 |

OTHER PUBLICATIONS

English International Search Report and Written Opinion dated Aug. 28, 2012.

McCormick, Robert L., et al., "Influence of Support on the Performance of Coal Hydrotreating Catalysts," Ind. Eng. Chem. Res., 1989, vol. 28.

Louwers, S. P. A., et al., "The Effect of Passivation on the Activity and Structure of Sulfided Hydrotreating Catalysts," Journal of Catalysis, 1993, pp. 579-596, vol. 144.

Inoue, Shinichi, et al., "Novel Preparation of Titania (TiO2) Catalyst Support by Applying the Multi-Gelation Method for Ultra-Deep HDS of Diesel Oil," Fuel Chemistry Division Preprints 2003, 48(1), 88.

Lecrenay, Emmanuel, et al., "Hydrodesulfurizaiton Activity of CoMo and NiMo Supported on Al2O3-TiO2 for Some Model Compounds and Gas Oils," Applied Catalysis, 1998.

English Abstract of JP 5640432, Apr. 16, 1981.
English Abstract of CN 101360560.
English Abstract of JP 2008296187.
English Abstract of JP S5632308.
English Abstract of JP 2009513786.
English Abstract of JP S5980737.
English Abstract of JP H08183964.

* cited by examiner

TITANIA-SUPPORTED HYDROTREATING CATALYSTS

This U.S. patent application is a national stage application of PCT/EP2011/073210 filed on 19 Dec. 2011 and claims priority of European patent document EP 10196016.9 filed on 20 Dec. 2010, the entireties of which are incorporated herein by reference.

FIELD OF THE INVENTION

The invention is concerned with shaped $TiO_2$-supported catalysts containing at least molybdenum or tungsten as active components for hydrotreating processes, in particular for the removal of sulfur and nitrogen compounds as well as metals out of crude oil fractions and for the hydrogenation of sulfur oxides.

BACKGROUND OF THE INVENTION

Generally, hydrotreating reactions involve the application of hydrogen to a substrate, usually under elevated temperature and pressure, in the presence of a catalyst with the target of causing a physical or chemical change in the substrate. Most such hydrotreating reactions occur in refinery operations where the substrate is a hydrocarbon feedstock.

Conventional hydrotreating catalysts are generally in the form of a carrier of a refractory oxide material on which metal compounds providing the hydrogenation components have been deposited, the choice and amount of each component being determined by the intended use. Refractory oxide materials common in the art are amorphous or crystalline forms of alumina, silica and combinations thereof. These oxide materials can have some intrinsic catalytic activity but often only provide the support on which active metals compounds are present.

The metals are generally base or precious metals from Group VIII and Group VIB of the Periodic Table which are deposited in oxidic form during manufacture; in the case of base metals, the oxides are then sulphided prior to use to enhance their activity.

According to the present state of the art, catalysts based on molybdenum or tungsten together with either cobalt or nickel as promotor are employed for the removal of sulfur and nitrogen compounds and of metals out of crude oil fractions. Such catalysts are known as hydrotreating catalysts. Almost universally alumina is employed as a support for such hydrotreating catalysts. Alumina-supported catalysts can be easily shaped by extrusion and provide after calcination mechanically strong bodies.

Hydrotreating of crude oil fraction is performed in two types of reactors. The first reactor type is known as ebullating bed reactors. The catalyst bodies are kept floating in a stream of liquid and gas. The flow is controlled thus that the catalyst bodies remain floating and are neither entrained with the upwards flow of the liquid nor settle to the bottom of the reactor.

The other type of reactor is employing a trickle flow process. A gas flow and a liquid flow are passed downwards through the reactor. The reactor is mainly filled by the gas phase, while the liquid crude oil fraction to be treated flows as a thin layer over the catalyst. Both types of reactor are calling for mechanical strong catalyst bodies. With the ebullating bed, the catalyst bodies are moving in the liquid flow, which readily leads to attrition with catalyst bodies of an insufficient mechanical strength. With the trickle flow process the catalysts are used in very large fixed-bed reactors.

Since the weight of the catalyst bed is considerable, the catalyst bodies have to be very strong to avoid fracturing of the catalyst bodies within the lower sections of the catalyst bed. Fracturing of the catalyst bodies leads to a rise in pressure drop of the gas flow passed through the fixed bed, which is technically not acceptable.

Alumina can provide a high surface area and a high bulk density, which is important for the amount of catalyst that can be loaded in a reactor of a given size, and can be readily extruded to bodies that get a high mechanical strength after calcination. Usually alumina produced from boehmite (AlOOH) or pseudo-boehmite is required to provide optimum results. Pseudo-boehmite exhibits needle-shape crystallites as boehmite, but the crystallites are much smaller. The shape of the alumina crystallites is maintained during calcination, but the alumina reacts to small crystallites of cubic γ-alumina, or depending on the calcination procedure to other transition aluminas.

In spite of the favorable properties of γ-alumina as a support for hydrotreating catalysts, the support exhibits some significant drawbacks. First of all cobalt and nickel are liable to react with the transition alumina to a spinel, cobalt aluminate or nickel aluminate, thus leading to a loss in any significant activity in the previously described hydrotreating reactions. Treatment with hydrogen or hydrogen and hydrogen sulfide does not release the majority of the cobalt and nickel from the aluminum spinel. Presumably molybdenum and tungsten react also with the alumina surface. The interaction leads to the supported molybdenum oxide and tungsten oxide more difficult to reduce and to react to $Mo(IV)S_2$ and $W(IV)S_2$.

Another drawback of alumina-supported hydrotreating catalysts involves the processing of spent catalysts. Though molybdenum and cobalt are expensive, it is difficult to reclaim the metals from the alumina support. Dissolution of the alumina support in alkali calls for much alkali and leads to a foaming solution. The molybdenum dissolves together with the aluminum in contrast to the cobalt, which is deposited as cobalt hydroxide. Filtration is difficult as well as the separation of the resulting molybdate from the aluminate solution. Generally spent hydrotreating catalysts are therefore disposed.

A final problem with alumina-supported hydrotreating catalysts is that the pore-size distribution of the catalyst cannot be adequately controlled. With catalytic reactions involving a solid catalyst and a liquid phase, the transport through the pores of the catalyst proceeds slowly. Catalyst bodies within a fixed-bed reactor cannot be made smaller than about 1 mm, since a smaller size leads to an unacceptably high pressure drop. With the necessarily large catalyst bodies, the pore length is thus that only the external edge of the catalyst bodies contributes significantly to the catalytic reaction. It is therefore essential to employ catalyst bodies with wide pores. However, a high pore volume, which is characteristic for wide pores, leads to a low mechanical strength. With the compromises that has to be settled between mechanical strength and width of pores, the mechanical strength is most important. The usual alumina-supported hydrotreating catalysts therefore exhibit a high mechanical strength and relatively narrow pores.

Particularly with the removal of metals from crude oil fractions, the relatively narrow pore mouths of usual alumina-supported hydrotreating catalysts are a drawback. Metals removed out of the crude oil fraction are deposited within the mouths of the pores, which leads to a rapid blocking of narrow pores and therefore deactivation of the catalyst.

A high pore volume is therefore attractive for hydrotreating catalysts. However, a high pore volume is difficult to combine with a high mechanical strength of the catalyst bodies. Since hydrotreating catalysts are employed in very large fixed bed reactors, the weight of the catalyst bed asks for a high mechanical strength of the catalyst bodies.

A support that can provide by extrusion catalyst bodies with an elevated pore volume of the same mechanical strength as alumina or even a higher strength without reacting with cobalt or nickel would be extremely valuable.

An alternative for alumina as a support is silica. However, silica is notoriously difficult to shape by extrusion. The dies are rapidly worn out by silica. Furthermore the bulk density of silica is significantly lower than that of alumina. Finally application of suitable molybdenum or tungsten compounds finely divided and uniformly distributed over silica surfaces is difficult. Silica-supported hydrotreating catalysts are consequently not useful.

Titania has already been proposed as a support for hydrotreating catalysts. Titania is generally produced by reaction of ilmenite, iron(II) titanate, $FeTiO_3$, with sulfuric acid. Dilution of the titanium sulfate solution leads to hydrolysis of titanium(IV) to hydrated titanium dioxide. The very small titanium dioxide particles are highly hydrated. Removal of the water leads to severe sintering of the titanium oxide to relatively large titania particles. The specific surface area of the titania is less than 50 $m^2$ per gram, which is considerably lower than that of the alumina employed as support for hydrotreating catalysts, viz., from about 130 to 250 $m^2$ per gram.

An alternative production procedure of titania proceeds via titanium tetrachloride. The titanium tetrachloride is brought into a hydrogen-oxygen flame, where it reacts to titania particles of about 30 nm. The resulting (pyrogenic) titania particles are always a mixture of the Anatase and Rutile phase of titania and exhibit a surface area of about 50 $m^2$ per gram and a pore volume of about 0.50 $cm^3$ per gram. The Rutile phase of titania is in general considered as detrimental for any catalyst formulation involving base metals as the Rutile phase very easily incorporates those metals by formation of metal titanates, which are not catalytically active. Indeed the reaction of metal oxides like Nickel oxides and Chromium oxides leads to the formation of yellow pigments, but not to active catalysts.

The effect of titania on the catalytic activity of hydrotreating catalysts has not been established unambiguously. First of all, the surface area of a titania support that is commercially available pyrogenic titania, has a surface area of about 50 $m^2$ per gram, which is considerably lower than the surface area of the γ-alumina, which is usually employed for the production of hydrotreating catalysts, viz., about 200-300 $m^2$ per gram. Another difference is that nickel and cobalt are promoting the activity of alumina-supported molybdenum and tungsten catalysts and have no significant effect on the activity of titania-supported catalysts.

In 1989, McCormick et al. investigated the influence of the support on the performance of coal liquid hydrotreating catalysts [Robert L. McCormick, Julia A. King, Todd R. King and Henry W. Haynes Jr. Ind. Eng. Chem. Res. (1989), 28, 940-947]. The authors studies a range of different supports, among which alumina, titania, and titania-alumina. The alumina-supported catalyst had a surface area of 167 $m^2$ per gram, a pore-volume as measured by mercuri porosimetry of 0.75 $cm^3$ per gram, and a pore volume measured by the condensation of nitrogen at 77 K (small pores) of 0.43 $cm^3$ per gram. The titania-supported cobalt-molybdenum catalyst had a surface area of 68 $m^2$ per gram a pore volume of 0.27 $cm^3$ per gram and a volume of small pores of 0.11 $cm^3$ per gram. A titania-alumina support was prepared by coprecipitation of aluminum trichloride and titanium tetrachloride by ammonia. Nickel and molybdenum was applied on the titania-alumina support. Whereas the alumina-supported and the titania-alumina supported catalysts exhibited a high activity and an excellent maintenance of the activity, the titania-supported catalyst displayed a poor activity and a low stability.

Prins et al. performed a careful and extensive study on cobalt-molybdenum and nickel-molybdenum catalysts supported on alumina, titania and carbon. The titania support had a surface area of 46 $m^2$ per gram and a pore volume of 0.5 $cm^3$ per gram, while the alumina showed a surface area of 233 $m^2$ per gram [S. P. A. Louwers, M. W. J. Crajé, A. M. van der Kraan, C. Geantet, and R. Prins, J. Catalysis (1993), 144, 579-596]. The activity of the alumina-supported catalyst was a factor of about 3.6 higher than that of the titania-supported catalyst.

Lecrenay et al. performed a study dealing with titania-alumina supports [E. Lecrenay, K. Sakanishi, T. Nagamatsu, I. Mochida, and T. Suzuka, Applied Catalysis B Environmental (1998) 18 325-330]. The authors studied the hydrodesulfurization of a number of model compounds, but also that of gasoils and light cycle oil. A pure alumina support was employed and two commercially produced titania-alumina supports by hydrolysis of titanium and aluminum alkoxides. The surface area of the catalysts were between 240 and 252 $m^2$ per gram and the pore volumes between 0.54 to 0.60 $cm^3$ per gram. Nickel and molybdenum and cobalt-molybdenum were applied on the supports. It is important that the activity for the hydrodesulfurization of gasoil dropped with the titania content and that of light cycle oil was with 8 wt. % titania about the same as that of pure alumina, while that with 25 wt. % titania was lower. It is therefore apparent that the effect of addition of titania to alumina for the hydrodesulfurization of gasoil and light cycle oil is not significant.

Concerning pure titania supports, Inoue et al. published a paper on a novel preparation procedure of titania supports [S. Inoue, H. Kudou, A. Muto, and T. Ono Fuel Division Preprints (2003) 48(1) 88-89]. The procedure employed was extensively described in U.S. Pat. No. 4,422,960 to Chiyoda Chemical Engineering and Construction Co., Ltd., Yokohama, Japan. The objective of the procedure is to produce supports of a volume of wide pores and a substantial surface area. The principle is based on controlled Ostwald ripening; small particles of the support are grown to larger particles under conditions that avoid the formation of smaller particles. Fairly uniform particles are thus obtained of a size leading to a high volume of large pores. The procedure has been applied to alumina, silica, titania, and sepiolite. The surface areas of thus produced titanias are between 133 and 175 $m^2$ per gram and the pores have a fairly uniform size varying with the size of the elementary titania particles between 6 to 20 nm. However, the pore-size distribution must be described by a fairly complicated procedure and an improved strength of the titania bodies has not been mentioned.

WO 2004/073854 describes a catalyst composition which comprises one or more Group VIB metals, one or more Group VIII metals, and a refractory oxide material which comprises 50 wt % or more titania, on oxide basis, which is prepared by precipitation techniques, and the use thereof in the hydroprocessing of hydrocarbonaceous feedstocks.

An alternative titania support can be obtained by a procedure described in EP-A1-1748033 as well as slightly differently in US 2010/0069233. The procedure involves treatment of titania, which is either amorphous, or consists of anatase, or of rutile, at temperatures from 100 to 300° C. with an alkaline solution, preferably sodium hydroxide. The reaction products have a special crystallographic structure that is different from anatase, rutile or brookite, and consists of non-uniform particles with an elongated shape, nanowires, nanofibers, or nanotubes. The material contains hydrogen or a combination of hydrogen and sodium. The titanium oxide preparation leads to relatively large surface areas, up to 300 $m^2$ per gram, and pore volumes, up to 0.70 $cm^3$ per gram.

Escobar et al. [J. Escobar, J. A. Toledo, M. A. Cortés, M. L. Mosqueira, V. Pérez, G. Ferrat, E. Lopez-Salinas, and E. Torres-Garcia Catalysis Today (2005) 106 p. 222-226] prepared titania in the form of nanotubes having a surface area higher than 300 $m^2$ per gram by the above proprietary methodology. The activity was twofold that of alumina-supported cobalt-molybdenum. The surface area of the support thus produced is fairly elevated, viz., 343 and 335 $m^2$ per gram. The pore volume varies more, viz., 0.70 and 0.47 $cm^3$ per gram. It is striking that application of the active components, cobalt and molybdenum, strongly affected the surface area, which dropped to 181 and 174 $m^2$ per gram as well as the pore volume, which was 0.29 $cm^3$ per gram after the impregnation. Preparing shaped titania supports, being sufficiently catalytically active, on the basis of powderous or nanotubular materials being loaded with the active metal compounds failed due to insufficient mechanical or catalytical properties.

The above state of art documents indicate that much work has been performed to improve the properties of hydrodesulfurization catalysts by employing titania as a support. The titania-alumina supported catalysts have not indicated a clear improvement of the catalytic performance. The surface area of the pure titania support produced by flame hydrolysis of titanium tetrachloride is not sufficient, while the support according to U.S. Pat. No. 4,422,960 and the support described by Escobar et al. above exhibit after impregnation with the active components a lower surface area and pore volume. All catalyst described are powder materials tested in micro testing units.

The use of titania, or titanium dioxide, as a catalyst support for a conventional hydroprocessing catalyst is limited by the lack of a useful pore structure. Therefore the few titania-supported commercial hydroprocessing catalysts as detailed above that exist in the market have a low pore volume and as a result can hold or support less hydrogenation metals than the more common alumina-supported catalysts. Generally it is acknowledged that thermal stability, low surface area and poor mechanical strength have all hindered the commercial exploitation of titania supported catalyst systems.

It is therefore an object of the present invention to provide titania-supported hydrodesulfurization catalysts of a sufficiently large surface area, a high pore volume and a high mechanical strength.

SUMMARY OF THE INVENTION

The inventors started from the findings that the application of molybdenum or tungsten alone or in combination with any of cobalt or nickel on titania does not automatically lead to a hydrodesulfurization catalyst of an improved activity. It has been known in the state of art as detailed above that both a decrease in activity and a rise in activity employing titania as a support had been reported as the surface area and the pore volume generally drops by application of the active components. The inventors of the present invention regarded the surface area of the titania-supported hydrodesulfurization catalysts per unit of reactor volume, which is determined by the surface area per unit weight and the bulk density, to be the most critical factor as the surface area per unit volume is determining the activity of the catalyst in a technical reactor.

Surprisingly, the inventors have found that the active component, molybdenum or tungsten, optionally in combination with cobalt or nickel can be applied on titania support bodies commercially obtainable from Euro Support Manufacturing, Amersfoort, The Netherlands, without significantly affecting the accessible surface area, the accessible pore volume and the mechanical strength of the resulting catalyst bodies. Such support bodies usually have a mechanical strength of 10 N/mm, a surface area of 225 $m^2$/g and a pore volume measured by mercury porosimetry of 0.4 $cm^3$/g.

Since the wide pores, which are measured with mercury porosimetry, are most important for the inventive desulfurization catalysts according to the understanding of the inventors, they have focussed on the pore volume as measured with mercury porosimetry. In view of the above discussed state of the art it is surprising and not to be expected that after the application of active components on the commercially obtainable titania supports the surface area, the pore volume and the mechanical strength of the thus obtained bodies are still remarkably high.

DETAILED DESCRIPTION OF THE INVENTION

This invention relates to the hydroprocessing catalyst and hydroprocessing of chemical and petroleum feedstocks using said catalyst composition containing Mo and/or W and optionally Ni and/or Co and an inert refractory oxide, of which 80 wt % or more is titania and the remainder being silicon dioxide.

In more detail, the present invention provides a supported catalyst composition for hydrotreating in the form of shaped titania support bodies having at least one oxide of molybdenum and/or tungsten on the surface thereof and having a surface area of at least 80 $m^2$ per gram, a pore volume measured by mercury porosimetry of at least 0.25 $cm^3$/g, a side-crush strength greater than 7 N/mm, and a tapped bulk density in the range of 600-1200 $kg/m^3$.

The freshly calcined catalyst has generally a surface area of at least 80 $m^2$ per gram, preferably of at least 125 $m^2$ per gram, and even more preferably of at least 135 $m^2$ per gram and most preferably of at least 150 $m^2$ per gram, a pore volume measured by mercury porosimetry of at least 0.25 $cm^3$/g, preferably of at least 0.30 $cm^3$/g, and more preferably of 0.34 $cm^3$/g, a side crushing strength of at least 7 N/mm, preferably at least 8 N/mm, and more preferably at least 10 N/mm, and a tapped bulk density in the range of 600-1200 $kg/m^3$, more preferably 800-1200 $kg/m^3$.

As known in the state of art, for example in "Catalyst Handbook" (2nd Edition) by Martyn V. Twigg, (1989) or "Fundamentals of Industrial Catalytical Processes" by Robert J. Farrauto and Calvin H. Bartholomew (1997), the properties of the catalyst in respect of side crush strength and bulk density are important parameters for their usefulness as catalyst in the reactors. The side crush strength is defined as the resistance of formed catalysts to compressive forces. Measurements of the side crush strength are intended to provide an indication of the ability of the catalyst to maintain its physical integrity during handling and use. A standard test method for radial crush strength of extruded catalyst and catalyst carrier particles is described in ASTM D6175-03 (2008) which is also applied here as detailed below.

The measurement of tapped density has been formalized in a number of standard methods such as for catalysts in ASTM 4164 as a "Standard Test Method for Mechanically Tapped Packing Density of Formed Catalyst and Catalyst Carriers" which is applied here as detailed below.

The inventive supported catalyst composition for hydrotreating is obtainable by applying an aqueous solution of at least one salt of molybdenum and/or tungsten on titania support bodies and calcining the obtained bodies.

The term hydroprocessing is used herein to cover a range of hydrotreatment processes where the hydrocarbon feed is brought in contact with hydrogen in order to modify key physical and chemical properties.

For applying the aqueous solution of at least one salt of molybdenum and/or tungsten on titania support, solutions of molybdenum and/or tungsten in the form of their water-soluble salts are generally used; aqueous solution of molybdates and/or tungstates or metal-phosphorous complexes (e.g. heteropolyacids) are preferred.

During the application step, the hydrated forms of the metal components are deposited onto the titania support. In more detail, suitable precursors such as metals salts are dissolved in water in the concentrations to result in the desired metals loading upon (dry) impregnation, drying and calcination. Good examples are basic cobalt or nickel carbonate, ammonium molybdate or tungstate salts. These are converted into e.g. heteropolyacid structures. This can be achieved by heating the dissolved compounds in water, optionally in the presence of a complexing agent such as phosphoric acid. First, mechanically shaped titania supports can be loaded in a suitable vessel, such as a blender, e.g. a cone blender. The pore volume impregnation was effected with an impregnation solution at the rate of 0.01-0.1 ml/min/g support. The amount might be varied depending on the intended load of the supports. After dosing of the impregnation solution, the impregnated formed bodies are aged, preferably for at least 12 hrs, more preferred for at least 24 hours. The resulting material is then subjected to drying and calcining steps. Before drying, an aging step of the freshly impregnated material is preferably carried out for a time of up to 36 hours, preferably between 12 and 24 hours in order to serve for a more homogeneous distribution of the metal components deposited in the pores of the material. The drying step is carried out at a temperature in the range of 100° to 150° C. for a time up to several hours in order to remove the solvent. Thereafter, calcination is typically carried out for a time between 30 and 240 minutes at a temperature in the range of 300° to 600° C. The active catalyst is obtained after a sulfidation step in which metal oxides are converted to their corresponding sulfides. The sulfidation can be done in an ex-situ presulfiding step or in-situ after loading of the catalyst in the hydrotreatment reactor with sulfur compounds and processes known to those skilled in the art.

By the term 'supported' or 'support' it is to be understood that the composition has a preformed, shaped catalyst support which is then loaded with metal compounds via impregnation or deposition. Generally, in this supported catalyst composition, the support is a separate distinct material within the composition, i.e. the support is generally not prepared, in a shaping process, from powderous material already loaded with metal compounds. Said shaping can be effected mechanically, for example, by extrusion of a paste-like material. The shaped bodies have generally a diametral size of a few millimeters in a range starting from 1 up to 10 mm. The shape of the bodies can be cylindrical, trilobal, tetralobal as long as the mechanical properties are maintained.

In one embodiment, the inventive titania support can contain 70 to 100 wt. %, preferably 80 to 100 wt. % $TiO_2$ and up to 30 wt. %, preferably 20 wt. % silica, which can raise the thermal stability of the titania.

One embodiment of the inventive catalyst composition has a content of molybdenum and/or tungsten in the range of 9.0 to 25.0 wt. %, preferably 10 to 16 wt. %, more preferably 12 to 16 wt %, calculated as trioxides, on the total weight of the calcined catalyst.

Another embodiment of the inventive catalyst composition can, in addition to the content of molybdenum and/or tungsten, have a content of at least one of cobalt and nickel in the range of up to 10 wt. %, preferably 6.5 wt. %, more preferably 2 to 4 wt. %, expressed as $Co_3O_4$ or NiO and calculated on the total weight of the supported catalyst composition. Suitable nickel compounds, based on a similar criteria as for molybdenum, are nickel carbonate, nickel oxide, nickel hydroxide, nickel phosphate, nickel formiate, nickel sulfide, nickel molybdate, or a mixture of two or more thereof. Additionally soluble salts such as nickel nitrate, sulphate or acetate may be used in combination with one or more of these compounds and/or with each other. The corresponding cobalt compounds are also suitable.

Preferably, the inventive catalyst composition contains a combination of molybdenum and cobalt in the aforementioned content ranges for each metal.

Though the present invention is directed to supports being loaded with the afore mentioned metal compounds, the invention is also concerned with a supported catalyst composition for catalytic processes like hydrogenation and oxidation reactions in the form of shaped titania support bodies having at least one catalytically active material, selected from platinum, palladium, rhodium renium silver and gold or mixtures in an amount of up to 8% wt, preferably 5% wt, calculated on the total weight of the calcined catalyst, loaded on the surface thereof and having a surface area of at least 80 $m^2$ per gram, a pore volume measured by mercury porosimetry of at least 0.25 $cm^3/g$, a side-crush strength greater than 7 N/mm, and a tapped bulk density in the range of 600-1200 $kg/m^3$.

The active components have been applied finely divided on the titania support, which leads to the precursor (oxides) of the active species being advantageously smaller than 50 nm and preferably smaller than 20 nm. Preferably scanning transmission electron microscopy with elemental analysis is used to assess the size of the active components. It has been surprisingly found that the catalysts according to the invention are very well appropriate to hydrogenate sulfur dioxide to hydrogen sulfide, in particular in the hydrogenation step required in the so-called SCOT process to treat Claus tail gases.

The multi-step Claus process recovers sulphur from the gaseous hydrogen sulphide present in raw natural gas and from the by-product gases containing hydrogen sulphide derived from refining crude oil and other industrial processes. The by-product gases mainly originate from physical and chemical gas treatment units (Selexol, Rectisol, Purisol and amine scrubbers) in refineries, natural gas processing plants and gasification or synthesis gas plants. These by-product gases may also contain hydrogen cyanide, hydrocarbons, sulphur dioxide or ammonia. Gases with an $H_2S$ content of over 25% are suitable for the recovery of sulphur in straight-through Claus plants. The tail gas from the Claus process is still containing combustible components and sulphur compounds ($H_2S$, $H_2$ and CO) is either burned in an incineration unit or further desulphurized in a downstream tail gas treatment unit.

In such SCOT (Shell Claus Off-Gas Treating) process, the gas flow out of the last catalytic Claus reactor is cooled to condense the elementary sulphur, after which the gas flow has to be reheated to establish the temperature required to hydrogenate the remaining sulphur dioxide to hydrogen sulphide. The hydrogen sulphide can be selectively removed by absorption into liquids containing alkanolamines. Remaining sulphur dioxide reacts irreversibly with the alkanolamines, in contrast to hydrogen sulphide, which can be thermally desorbed. Therefore, sulphur dioxide has to be removed completely.

It is commercially very attractive to perform the reheating of the gas flow out of the sulfur condensor with steam, and surprisingly, the catalyst according to this invention has a high activity in a temperature range from 200° C. to 240° C. It was particularly surprising that, even at lower temperatures such as 200° C., a complete conversion of sulfur dioxide can be achieved. Since the temperature that can be established with steam is about 240° C., the inventive catalyst is of particular advantage in the SCOT process in view of its sufficiently high activity already at 200° C. to 240° C., in particular between 215° C. and 240° C.

The final sulfur recovery of the SCOT process and the like is mainly determined by the amount of mercaptanes formed during the hydrogenation of sulfur dioxide and the effectiveness of the simultaneous removal of COS and $CS_2$ by hydrolysis, with the water contained in the process gas. It has been observed that the amount of mercaptanes generated employing the inventive titania-supported catalyst is substantially lower than the amount produced by an alumina-supported catalyst.

Very high hydrolysis efficiencies can be obtained with the catalysts according to the present invention, compared to alumina supported products and low pore volume titania based catalysts.

Also for the removal of metals out of crude oil fractions titania-supported catalysts according to the present invention are very attractive. Due to the high pore volume and macro/meso-porous properties of the support and inventive catalysts, much metal can be loaded on the catalyst bodies before plugging of the pores brings about a drop in activity. Moreover, due to the highly dispersed state of the active surface components, it is stated that these catalysts pick up much enhanced quantities of metallic foulants.

For the inventive catalysts, a further advantage has been surprisingly found, i.e. that the spent titania-supported catalysts can be treated for recovery of the metals in a very attractive way. It has been found by the inventors that, after combustion of the carbon deposited into and onto the catalyst bodies during the hydrotreating step, the metals, i.e. molybdenum, tungsten, cobalt, nickel as well as vanadium deposited on the catalysts from the crude oil fraction can be readily dissolved in a mixture of concentrated ammonia and ammonium carbonate. To raise the rate of the dissolution, the reaction can be performed at elevated pressures. The titania support does not dissolve in alkaline solutions, whereas molybdenum, tungsten and vanadium enters the solution as molybdates, tungstates or vanadates, and cobalt and nickel dissolve as ammonia complexes.

After separation from the titania support the cobalt and nickel can be separated by thermal desorption of the ammonia, which leads to precipitation of the corresponding carbonates. The other metal(s) present as oxyanions remain in the solution and can be recovered in further process steps.

Therefore, the invention also concerns a process for reclaiming the metals, particularly cobalt and/or molybdenum, from the inventive catalyst composition after use thereof, said process comprising the steps of calcining the catalyst composition in air at a temperature in the range of 400-700° C. and subsequent treating the calcined catalyst composition with solvent for the metal compounds, for cobalt and molybdenum an aqueous solution of ammonia and ammonium carbonate, and recovering the solved metals from the solution.

For cobalt and molybdenum, the further treatment envisages a step of evaporating the ammonia and recovering the formed cobalt carbonate, and after separation of cobalt carbonate, the step of evaporating water to obtain the molybdenum metal as molybdate which might any ammonium molybdate.

The invention will further be illustrated by way of the following examples for preparing and testing the inventive catalysts.

EXAMPLES

Example 1

For preparing the inventive supported catalyst composition, a $TiO_2$-material commercially available form Euro Support Manufacturing in the form of trilobes was used and impregnated with solutions of the metal salts. Generally, two types (A, B) of impregnation solutions were used exemplarily here, but other solutions with different ratios of the metals might be used to obtain differing loads on the support as long as the ratios lead to the loads as defined in the claims. The impregnation solutions used in the following examples were based on:
A) Complex molybdates dissolved as polyoxy-anions and Cobalt nitrate
B) Molybdenum and Phosphorous based heteropolyacids and Cobalt nitrate
Solution Preparation:
Preparation of Solution A:

27.86 gram of $(NH_4)_2Mo_2O_7$ was added under stirring to 52.4 ml of demineralised water at a temperature of 60° C. After 5 minutes of stirring at the temperature, 3.81 gram of $MoO_3$ was added. When the $MoO_3$ was dissolved the solution was cooled to 30° C. A solution of 37.6 gram of $Co(NO_3)_2$ (Co content 13.4%) was added. The final pH of the resulting solution was 4.7. The total volume of the solution was 100 ml.
Preparation of Solution B:

42.66 gram of $MoO_3$ was added under stirring to 85.9 ml of water at 65° C. After 20 minutes 3.27 gram of $H_3PO_4$ (concentration 85 wt. %) was added. Subsequently 14.27 gram of Cobalt carbonate (Co content 45.3%) was added stepwise. After the addition of the total amount of Cobalt carbonate was finished 1.19 gram $HNO_3$ (concentration 65%) was added. The solution was cooled to room temperature. The final pH of resulting solution was 4.1. The total volume of the solution was 100 ml.

Impregnation Procedure:

100 grams of the titania supports indicated as S-1 or S-2 (Table 1), which are commercially available form Euro Support under the trade names Mirkat 200, 300 and 400, were loaded in a cone blender. The pore volume impregnation was effected with solution A or B by addition of 42 ml of the impregnation solution at the rate of 0.5 ml/min here. The amount might be varied depending on the intended load of the supports. After dosing of the impregnation solution, the impregnated formed bodies were aged for 24 hours. Next the catalyst was dried at 120° C. (overnight) and calcined at 400° C. (1 hour).

The characterizations of the supports S-1 and S-2 and of the impregnated catalysts are detailed in the following Tables 1 and 2. The abbreviations used in the tables have the following meaning:

BET-SA: Total specific surface area, determined by nitrogen adsorption, according to the theory developed by Brunauer, Emmet and Teller.

$PV_{Hg}$: Pore volume as determined by mercury intrusion up to a pressure of 2000 bar TBD: Tapped bulk density as measured according to ASTM (American Society for Testing And Materials) method D 4164-03.

CS: Side crush strength (N/mm). The force that is applied to break an extruded body in radial direction. The method applied deviates from the ASTM method D 6175-03 in that, in the method here, a 2 mm anvil and a flat plate have been used instead of two flat plates.

TABLE 1

| Support | Shape/size | BET SA ($m^2/g$) | $PV_{Hg}$ (ml/g) | TBD ($kg/m^3$) | CS (N/mm) |
|---|---|---|---|---|---|
| S-1 | 1.8 mm trilobes | 266 | 0.43 | 690 | 10 |
| S-2 | 1.8 mm trilobes | 229 | 0.44 | 706 | 15 |

The two supports S-1 and S-2 have been treated by applying solution B to it, and the following characteristics for the obtained inventive catalysts C-1 and C-2 have been observed as shown in Table 2.

TABLE 2

| Catalyst | Support | BET SA ($m^2/g$) | $PV_{Hg}$ (ml/g) | $Co_3O_4$ (wt %) | $MoO_3$ (wt %) | TBD ($kg/m^3$) | CS (N/mm) |
|---|---|---|---|---|---|---|---|
| C-1 | S-1 | 180 | 0.34 | 3 | 15.1 | 900 | 11 |
| C-2 | S-2 | 159 | 0.37 | 3.1 | 14.6 | 979 | 17 |

Example 2

In a comparative example, the above two titania-based catalysts C-1 and C-2 according to the invention have been used in testing of HDS/HDN using respectively LGO as feed stock, with low sulfur and nitrogen content, and a mix of heavier feed stocks with a high sulfur and nitrogen content. The characterizations of the impregnated catalysts and of alumina-supported reference catalysts RC-1 and RC-2 (characteristics summarised in Table 3).

TABLE 3

| Catalyst | Support | Size | BET SA ($m^2/g$) | $PV_{Hg}$ (ml/g) | $Co_3O_4$ (wt %) | $MoO_3$ (wt %) | TBD ($kg/m^3$) | CS (N/mm) |
|---|---|---|---|---|---|---|---|---|
| C-1 | S-1 | 1.8 mm trilobes | 180 | 0.34 | 3 | 15.1 | 900 | 11 |
| RC-1 | alumina | 1.1 mm trilobes | 190 | 0.56 | 6.2 | 22.6 | 742 | |
| C-2 | S-2 | 1.8 mm trilobes | 159 | 0.37 | 3.1 | 14.6 | 979 | 17 |
| RC-2 | alumina | 1.3 mm extrusion | 127 | 0.31 | 4.5 | 26.5 | 915 | 21 |

The following Table 4 shows the available BET surface area per unit volume in the test reactor.

TABLE 4

| Catalyst | BET SA ($m^2/g$) | Test reactor loading density (kg/m3) | BET surface area per loaded volume in test reactor ($m^2/l$) |
|---|---|---|---|
| C-1 | 180 | 900 | 162000 |
| RC-1 | 190 | 742 | 140980 |
| C-2 | 159 | 979 | 155661 |
| RC-2 | 127 | 915 | 116205 |

Testing Procedure:

In the following experiments, an isothermal reactor (30 mm inner diameter) was loaded with 100 ml catalyst. The catalysts were pre-sulfided using DMDS(dimethyl disulfide). The pre-sulfiding procedure is well known to those skilled in the art.

Example 3

In another comparative example, after presulfiding catalyst C-1 and its reference RC-1 were tested using a feed as specified in Table 5.

TABLE 5

| | | |
|---|---|---|
| Density@ 15° C. | [$kg/m^3$] | 848.3 |
| Refractive index @ 20° C. | | 1.4716 |
| Sulfur content | [mg/kg] | 7990 |
| Nitrogen content | [mg/kg] | 112.7 |
| Color ASTM D 1500 | | 0.3 |
| Bromine index | [mg Br/100 g] | 2958 |
| Composition by liquid chromatography (HPLC) | | |
| Saturated | [% m/m.] | 68.4 |
| Monoaromatics | [% m/m.] | 20.2 |
| Diaromatics | [% m/m.] | 11.2 |
| Triaromatics | [% m/m.] | 0.2 |

The test conditions were as follows: Pressure ($H_2$):3 MPa; WHSV: 1.0 $kg_{feed}/l_{cat}/h$; $H_2$/feed: 350 $l_n/kg_{feed}$ (average); Temperature: 350, 360, 370° C.

The HDS and HDN activity of the catalysts was as summarised in Table 6.

TABLE 6

| Temperature (° C.) | C-1 ppm S | RC-1 ppm S | C-1 ppm N | RC-1 ppm N |
|---|---|---|---|---|
| feed | 8000 | 8000 | 112 | 112 |
| 350 | 34 | 30.7 | 5.1 | 16.6 |
| 360 | 17.3 | 12.5 | 3.4 | 12.6 |
| 370 | 8.4 | 7.65 | 2.9 | 8.0 |
| Temperature (° C.) at 10 ppm | 367 | 362 | 340 | 370 |

Example 4

In yet another comparative example, after presulfiding catalyst C-2 and its reference (RC-2) were tested using a feed as specified in Table 7.

TABLE 7

| Density @15° C. | [kg/m³] | 939.2 |
|---|---|---|
| Density @50° C. | [kg/m³] | 915.8 |
| Refraction index $n_D$50° C. | | 1.5110 |
| Colour ASTM D 1500 | | >8 |
| Freezing point | [° C.] | +39 |
| Sulphur content | [% hm.] | 2.28 |
| Nitrogen content | [ppm] | 2258 |
| Carbon precursors (MCRT) | [% hm.] | 1.34 |
| Metal content: | | |
| V | [mg/kg] | 1.90 |
| Ni | [mg/kg] | 0.62 |
| Fe | [mg/kg] | 1.78 |
| GC separation Sawatzky: | | |
| saturated | [% hm.] | 31.0 |
| mono-aromatic | [% hm.] | 22.0 |
| di-aromatic | [% hm.] | 13.2 |
| tri-aromatic | [% hm.] | 13.3 |
| poly-aromatic | [% hm.] | 18.8 |
| polar compound | [% hm.] | 1.7 |

The test conditions were as follows: Pressure ($H_2$): 6 MPa; WHSV: 1.0 kg/l catalyst/h; $H_2$/Feed-330 m³/m³; Temperature program: 370-390-405-420° C.

The HDS and HDN activities of the catalysts have been summarised in Table 8.

TABLE 8

| Temp. Celsius | C-2 ppm S | RC-2 ppm S | C-2 ppm N | RC-2 ppm N |
|---|---|---|---|---|
| Feed | 22800 | 22800 | 2258 | 2258 |
| 370 | 2972 | 3445 | 1250 | 1250 |
| 390 | 966 | 1619 | 938 | 1050 |
| 405 | 534 | 1047 | 809 | 960 |
| 420 | 412 | 686 | 826 | 1042 |

Example 5

A series of catalysts has been prepared for testing of $SO_2$ hydrogenation and hydrolysis reactions. The catalysts have been prepared using preparation methods A or B (Example 1) using a range of titania support materials as outlined in Tables 9 and 10.

TABLE 9

| Support | Shape/size | BET SA (m²/g) | $PV_{Hg}$ (ml/g) | TBD (kg/m³) | CS (N/mm) |
|---|---|---|---|---|---|
| S-3 | 1.8 mm trilobes | 211 | 0.42 | 793 | 13 |
| S-4 | 1.8 mm trilobes | 162 | 0.48 | 639 | 8 |
| S-5 | 1.5 mm extrusions | 266 | 0.43 | 721 | 8 |
| S-6 | 2.3 mm extrusions | 166 | 0.32 | 885 | 10 |
| S-7 | 1.8 mm trilobes | 229 | 0.44 | 706 | 15 |

TABLE 10

| Catalyst | Support | Method | Shape | BET SA (m²/g) | $PV_{Hg}$ (ml/g) | $Co_3O_4$ (wt %) | $MoO_3$ (wt %) | CS (N/mm) | TBD (kg/m³) |
|---|---|---|---|---|---|---|---|---|---|
| C-3 | S-5 | B | 1.5 mm circular extrusions | 140 | 0.35 | 3.1 | 15.0 | 9 | 1163 |
| C-4 | S-6 | B | 2.3 mm circular extrusions | 155 | 0.26 | 2.2 | 11.2 | 10 | 1066 |
| C-5 | S-7 | B | 1.8 mm trilobes | 159 | 0.37 | 3.1 | 14.6 | 17 | 979 |
| C-6 | S-4 | B | 1.8 mm trilobes | 131 | 0.37 | 2.7 | 13.9 | 7 | 886 |
| C-7 | S-7 | A | 1.8 mm trilobes | 190 | 0.40 | 2.4 | 10.6 | 15 | 898 |
| C-8 | S-3 | B | 1.8 mm trilobes | 156 | 0.39 | 3.2 | 14.3 | 10 | 982 |

Table 11 summarises the characteristics of commercial alumina based CoMo reference catalysts RC-3 and RC-4 for $SO_2$ hydrogenation and $CS_2$ and COS hydrolysis in Claus tail gas, one specifically for operating temperatures <240° C., the other for temperatures >260° C.

TABLE 11

| Catalyst | Shape | BET SA (m²/g) | PV$_{Hg}$ (ml/g) | Co$_3$O$_4$ (wt %) | MoO$_3$ (wt %) | CS | TBD (kg/m³) |
|---|---|---|---|---|---|---|---|
| RC-3 for T < 240° C. | 2.2 mm trilobes | 248 | 0.67 | 3.1 | 13.6 | 38 (N/mm) | 669 |
| RC-4. for T > 260° C. | 3-5 mm spheres | 304 | 0.43 | 2.9 | 9.1 | 100 (N) flat plate | 763 |

The following table shows the available BET surface area per unit volume in the test reactor.

TABLE 12

| Catalyst | BET specific surface area (m²/g) | Test reactor loading density (kg/m3) | BET surface area per loaded volume in test reactor (m²/l) |
|---|---|---|---|
| C-3 | 140 | 1131 | 158312 |
| C-4 | 155 | 1036 | 160503 |
| C-5 | 159 | 966 | 153642 |
| C-6 | 131 | 829 | 108547 |
| C-7 | 190 | 869 | 165034 |
| C-8 | 156 | 926 | 144503 |
| RC-3 | 248 | 647 | 160605 |
| RC-4 | 304 | 712 | 216326 |

Example 6

The previously described catalysts C-3 to C-8 according to the invention have been tested comparatively with two reference catalysts RC-3 and RC-4 at a range of temperatures. The catalysts were pre-sulfided before testing in a gas stream containing 1 mol % H$_2$S, 4 mol % H$_2$, N$_2$ balance, at a space velocity (GHSV) of 650 Nm³/m³/h for 16 hours, at a temperature of 375° C. After pre-sulfiding the feed gas was switched to a gas containing 1 mol % H$_2$S, 0.5 mol % SO$_2$, 1.5 mol % H$_2$, 1.1 mol % CO, 16.7 mol % CO$_2$, 0.025 mol % COS, 0.025 mol % CS$_2$, 22 mol % H$_2$O, N$_2$ balance. The space velocity was either 825 or 1500 Nm³/m³/h. The catalysts were tested at 290° C., 260° C., 230° C., 220° C., 215° C. and 200° C., for ca. 12 hours at each temperature. The catalytic activity was characterized by SO$_2$, CS$_2$, COS and CO conversion, as well as production of methyl mercaptan, CH$_3$SH. The results of testing at a space velocity of 825 Nm³/m³/h are summarized in Table 13. The data refer to the conversions and mercaptan production after 12 hours testing at each temperature.

TABLE 13

| Temperature: | SO$_2$ conversion (%) | CS$_2$ conversion (%) | COS conversion (%) | CO conversion (%) | CH$_3$SH in product gas (mol ppm dry basis) |
|---|---|---|---|---|---|
| 290° C. | | | | | |
| C-3 | 100 | 100 | 92 | 99 | 0 |
| C-4 | 100 | 100 | 92 | 99 | 0 |
| C-5 | 100 | 100 | 91 | 99 | 0 |
| C-6 | 100 | 100 | 93 | 99 | 0 |
| C-7 | 100 | 100 | 92 | 99 | 0 |
| C-8 | 100 | 100 | 92 | 99 | 0 |
| RC-3 | 100 | 100 | 92 | 99 | 0 |
| RC-4 | 100 | 100 | 92 | 99 | 0 |
| 260° C. | | | | | |
| C-3 | 100 | 100 | 94 | 99 | 0 |
| C-4 | 100 | 100 | 95 | 99 | 0 |
| C-5 | 100 | 100 | 94 | 99 | 0 |
| C-6 | 100 | 100 | 95 | 99 | 0 |
| C-7 | 100 | 100 | 95 | 99 | 0 |
| C-8 | 100 | 100 | 94 | 99 | 0 |
| RC-3 | 100 | 100 | 94 | 99 | 0 |
| RC-4 | 100 | 100 | 94 | 99 | 14 |
| 230° C. | | | | | |
| C-3 | 100 | 100 | 95 | 100 | 41 |
| C-4 | 100 | 100 | 95 | 100 | 14 |
| C-5 | 100 | 100 | 96 | 100 | 23 |
| C-6 | 100 | 100 | 97 | 100 | 8 |
| C-7 | 100 | 100 | 96 | 100 | 18 |
| C-8 | 100 | 100 | 96 | 100 | 22 |
| RC-3 | 100 | 100 | 96 | 100 | 34 |
| RC-4 | 100 | 100 | 96 | 100 | 57 |
| 220° C. | | | | | |
| C-3 | 100 | 100 | 95 | 100 | 44 |
| C-4 | 100 | 100 | 97 | 100 | 31 |
| C-5 | 100 | 100 | 97 | 100 | 41 |
| C-6 | 100 | 100 | 97 | 100 | 18 |
| C-7 | 100 | 100 | 97 | 100 | 33 |
| C-8 | 100 | 100 | 97 | 100 | 40 |
| RC-3 | 100 | 100 | 96 | 100 | 63 |
| RC-4 | 100 | 99 | 94 | 99 | 80 |
| 215° C. | | | | | |
| C-3 | 100 | 100 | 95 | 100 | 59 |
| C-4 | 100 | 100 | 97 | 100 | 44 |
| C-5 | 100 | 100 | 97 | 100 | 50 |
| C-6 | 100 | 100 | 97 | 100 | 39 |
| C-7 | 100 | 100 | 97 | 100 | 45 |
| C-8 | 100 | 100 | 97 | 100 | 53 |
| RC-3 | 100 | 100 | 95 | 100 | 75 |
| RC-4 | 100 | 99 | 90 | 99 | 77 |
| 200° C. | | | | | |
| C-3 | 100 | 100 | 95 | 100 | 107 |
| C-4 | 100 | 100 | 97 | 100 | 80 |
| C-5 | 100 | 100 | 96 | 100 | 101 |
| C-6 | 100 | 100 | 98 | 100 | 91 |
| C-7 | 100 | 100 | 95 | 100 | 76 |
| C-8 | 100 | 100 | 96 | 100 | 99 |
| RC-3 | 100 | 98 | 90 | 98 | 109 |
| RC-4 | 100 | 98 | 82 | 95 | 90 |

The results of testing at a space velocity of 1500 Nm³/m³/h are summarized in Table 14.

TABLE 14

| Temperature: | SO$_2$ conversion (%) | CS$_2$ conversion (%) | COS conversion (%) | CO conversion (%) | CH$_3$SH in product gas (mol ppm dry basis) |
|---|---|---|---|---|---|
| 290° C. | | | | | |
| C-3 | 100 | 100 | 92 | 98 | 0 |
| C-6 | 100 | 100 | 92 | 99 | 0 |
| C-7 | 100 | 100 | 92 | 99 | 0 |
| C-8 | 100 | 100 | 91 | 99 | 0 |
| RC-3 | 100 | 100 | 91 | 99 | 0 |
| RC-4 | 100 | 100 | 93 | 99 | 0 |
| 260° C. | | | | | |
| C-3 | 100 | 100 | 94 | 99 | 0 |
| C-6 | 100 | 100 | 95 | 99 | 0 |

TABLE 14-continued

| Temperature: | SO$_2$ conversion (%) | CS$_2$ conversion (%) | COS conversion (%) | CO conversion (%) | CH$_3$SH in product gas (mol ppm dry basis) |
|---|---|---|---|---|---|
| C-7 | 100 | 100 | 94 | 99 | 0 |
| C-8 | 100 | 100 | 94 | 99 | 0 |
| RC-3 | 100 | 100 | 93 | 99 | 0 |
| RC-4 | 100 | 100 | 94 | 99 | 18 |
| 230° C. | | | | | |
| C-3 | 100 | 100 | 90 | 98 | 36 |
| C-6 | 100 | 100 | 96 | 100 | 18 |
| C-7 | 100 | 100 | 94 | 99 | 32 |
| C-8 | 100 | 100 | 95 | 99 | 25 |
| RC-3 | 100 | 99 | 91 | 99 | 50 |
| RC-4 | 100 | 94 | 88 | 97 | 34 |
| 220° C. | | | | | |
| C-3 | 100 | 100 | 85 | 97 | 59 |
| C-6 | 100 | 100 | 93 | 100 | 35 |
| C-7 | 100 | 100 | 91 | 99 | 45 |
| C-8 | 100 | 100 | 89 | 99 | 43 |
| RC-3 | 100 | 97 | 84 | 98 | 78 |
| RC-4 | 100 | 81 | 62 | 85 | 23 |
| 215° C. | | | | | |
| C-3 | 100 | 100 | 76 | 96 | 77 |
| C-6 | 100 | 100 | 91 | 100 | 57 |
| C-7 | 100 | 100 | 88 | 98 | 57 |
| C-8 | 100 | 100 | 82 | 98 | 60 |
| RC-3 | 100 | 92 | 70 | 96 | 76 |
| RC-4 | 100 | 70 | 57 | 73 | 16 |
| 200° C. | | | | | |
| C-3 | 100 | 98 | 37 | 88 | 116 |
| C-6 | 100 | 98 | 55 | 93 | 115 |
| C-7 | 100 | 93 | 50 | 89 | 91 |
| C-8 | 100 | 95 | 20 | 86 | 112 |
| RC-3 | 100 | 72 | −8 | 86 | 56 |
| RC-4 | 100 | 65 | 56 | 51 | 15 |

As it can be seen from the above examples that the catalyst composition according to the invention is excellent in its HDS and HDN activity and can be advantageously used in processes for removal of sulfur and nitrogen compounds from crude oil fractions by treatment with hydrogen.

Catalysts according to the invention are also excellently suited for hydrogenation of SO$_2$ with complete conversion in gases like Claus off gas. At moderate temperatures, 215-230° C., the catalysts combine high hydrogenation and hydrolysis activities with a substantially lower mercaptan production, compared to alumina supported catalysts.

The invention claimed is:

1. Supported catalyst composition for hydrotreating, comprising:
   shaped titania support bodies having at least one oxide of molybdenum and/or tungsten on the surface thereof; and
   having a surface area of at least 80 m² per gram, a pore volume measured by mercury porosimetry of at least 0.25 cm³/g, a side-crush strength greater than 7 N/mm, and a tapped bulk density in the range of 600-1200 kg/m³,
   wherein the titania support bodies contain 70 to 100 wt. % TiO$_2$ and up to 30 wt. % silica.
2. Catalyst composition according to claim 1, wherein the titania support bodies contain 80 to 100 wt. % TiO$_2$ and up to 20 wt. % silica.
3. Catalyst composition according to claim 1, having a content of molybdenum and/or tungsten in the range of 9.0 to 16.0 wt. %, expressed as trioxides, calculated on the total weight of the supported catalyst composition.
4. Catalyst composition according to claim 1, further comprising a total content of at least one of cobalt and nickel in the range of 0 to 6.5 wt. %, expressed as Co$_3$O$_4$ or NiO, calculated on the total weight of the supported catalyst composition.
5. Catalyst composition according to claim 1, wherein at least 20 weight percent of the supported precursor particles of the catalytically active oxides being present after calcination are smaller than 50 nm.
6. Catalyst composition for hydrotreating according to claim 1, obtainable by applying an aqueous solution of at least one salt of molybdenum and/or tungsten on shaped titania support bodies followed by drying and calcining the obtained bodies.
7. Process for the preparation of a catalyst composition as claimed in claim 1 wherein a solution of at least one salt of molybdenum and/or tungsten is applied on titania support bodies in the presence of a protic solvent and optionally an alkali compound, the formed catalyst bodies are recovered following precipitation, drying and calcining the obtained bodies.
8. Process for reclaiming the metal selected from cobalt and molybdenum from the catalyst composition according to claim 1 after use thereof, said process comprising the steps of:
   calcining the catalyst composition in air at a temperature in the range of 400-700° C.; and
   subsequent treating the calcined catalyst composition with an aqueous solution of ammonia and ammonium carbonate.
9. Process according to claim 8, further comprising the step of evaporating the ammonia and recovering the formed cobalt carbonate.
10. Process according to claim 9, further comprising, after separation of cobalt carbonate, the step of evaporating water to obtain the molybdenum metal as molybdate.
11. A process for the hydrogenation of sulfur dioxide, comprising subjecting a reaction gas containing sulfur dioxide to a hydrogenation step with a catalyst composition according to claim 1, thereby hydrogenating the sulfur dioxide to hydrogen sulfide.
12. Process according to claim 11, wherein the hydrogenation step is carried out at a temperature from less than 250° C.
13. A process for removal of sulfur and nitrogen compounds from crude oil fractions comprising treating crude oil fractions with hydrogen and a catalyst composition according to claim 1, thereby removing the sulfur and nitrogen compounds.
14. A process for removal of metals out of crude oil fractions comprising treating crude oil fractions with hydrogen and a catalyst composition according to claim 1, thereby removing the metals.
15. The catalyst composition according to claim 1, wherein said titania support bodies contain no alumina.
16. The catalyst composition according to claim 1, wherein the titania support bodies comprise silica.
17. The catalyst composition according to claim 4, further comprising 2-6.5 wt. % of at least one of Co$_3$O$_4$ or NiO, based the total weight of the catalyst composition.
18. Catalyst composition according to claim 1, further comprising platinum, palladium, rhodium, rhenium, silver, gold, or mixtures thereof.

19. A catalyst composition for hydrotreating, comprising:
a preformed, shaped support comprising 70-100 wt. % $TiO_2$, wherein said support contains no alumina,
said support loaded with:
9-16 wt. % of $MoO_3$; and
2-6.5 wt. % of $Co_3O_4$.

* * * * *